April 7, 1942.  D. S. BOND  2,278,641
ELECTRONIC COMMUTATOR
Filed March 31, 1939   2 Sheets-Sheet 1
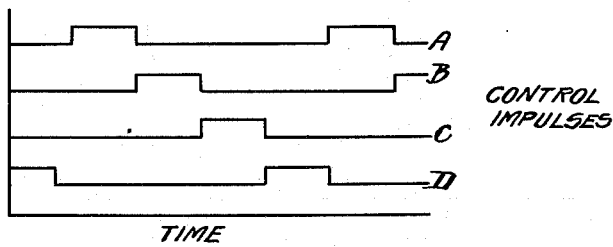
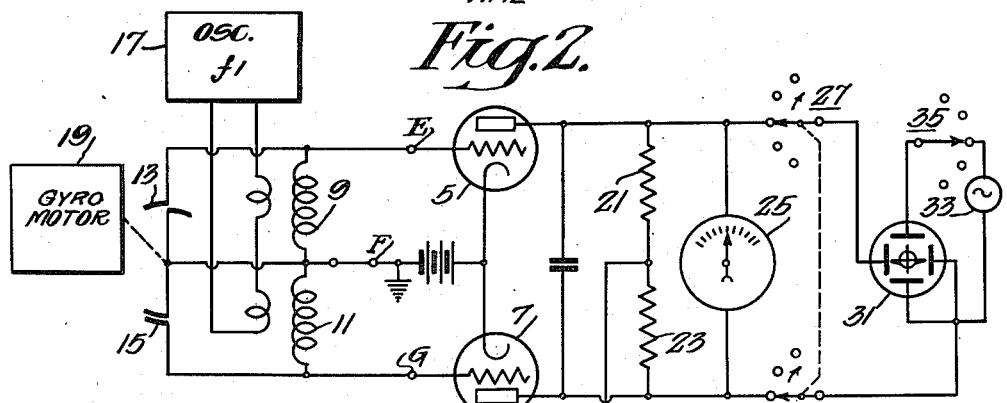
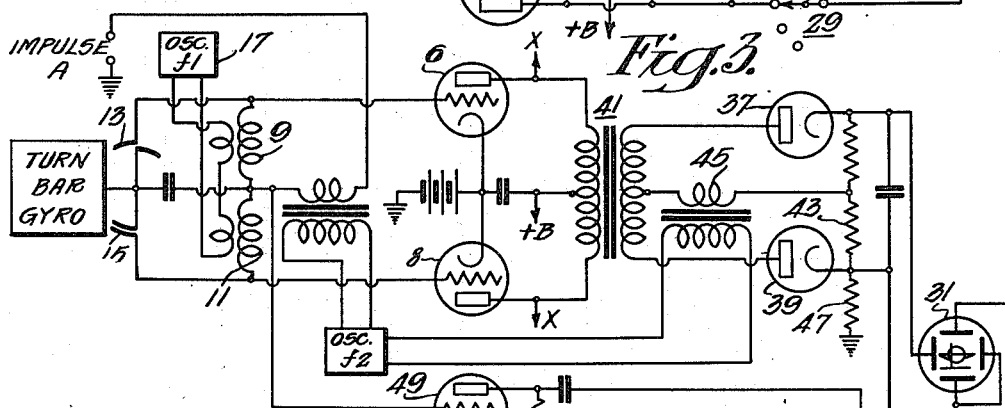
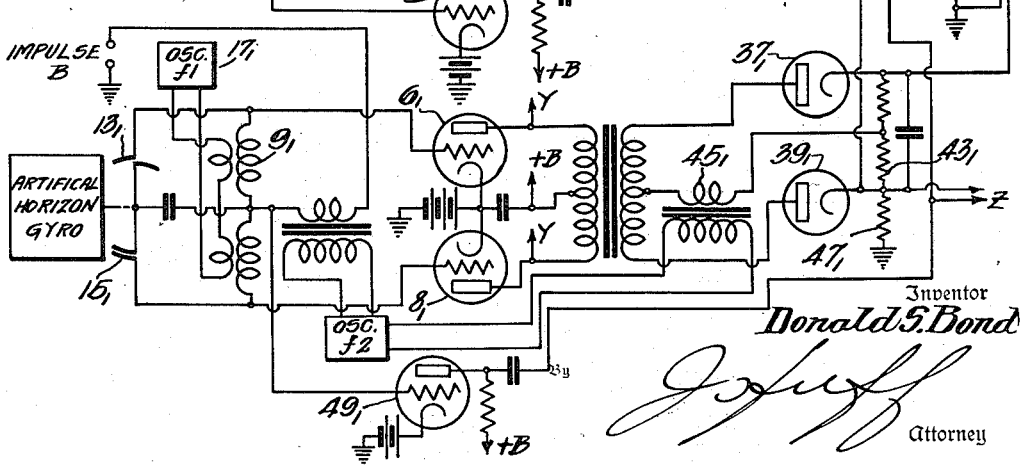
Inventor
Donald S. Bond
Attorney

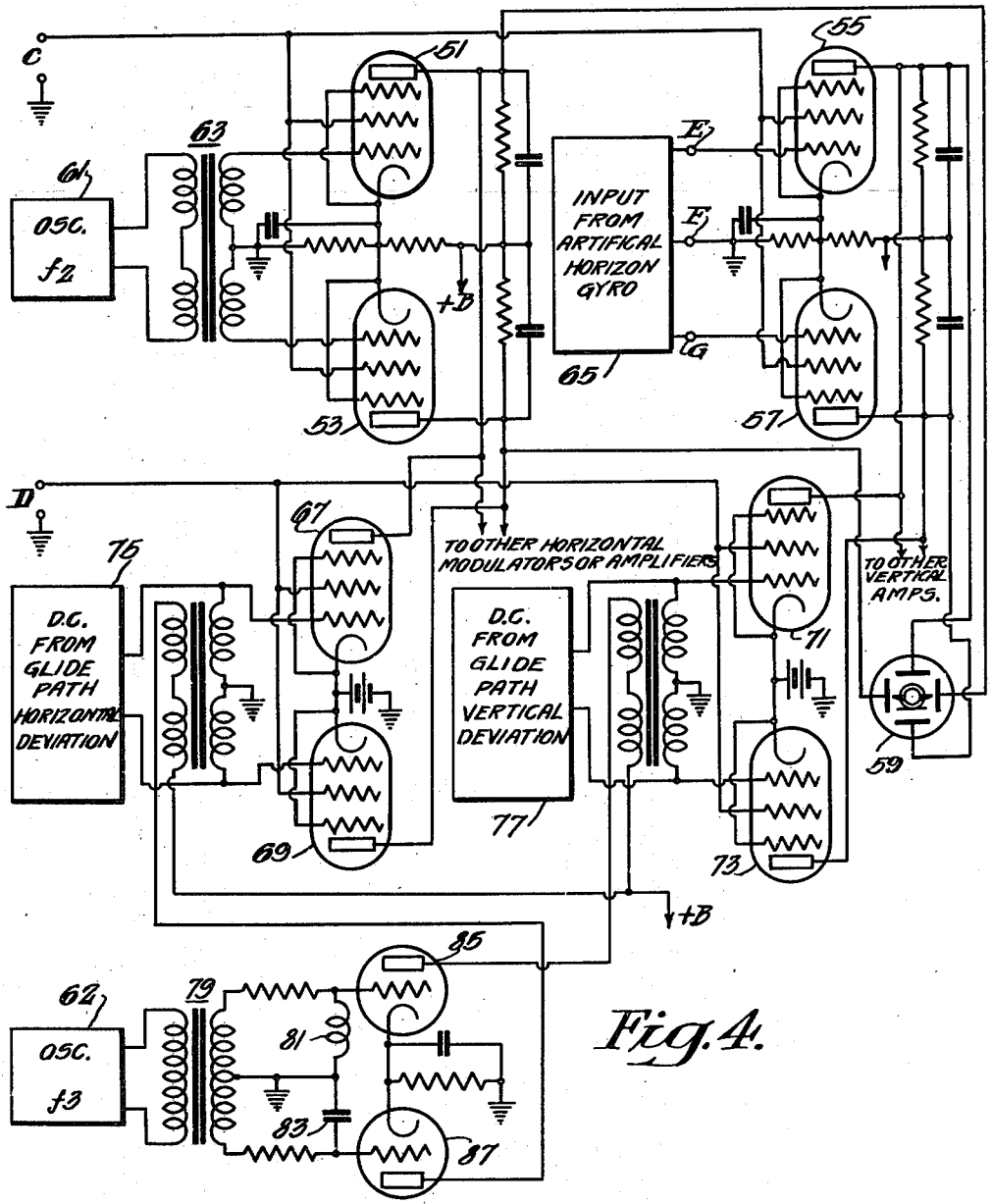

Patented Apr. 7, 1942

2,278,641

UNITED STATES PATENT OFFICE 2,278,641

ELECTRONIC COMMUTATOR

Donald S. Bond, Philadelphia, Pa., assignor to Radio Corporation of America, a corporation of Delaware Application March 31, 1939, Serial No. 265,281

6 Claims. (Cl. 177—311)

This invention relates to an improved method of and means for successively indicating a number of separate intelligence representing alternating and direct current voltages, and has for its principal objects the provision of an electronic commutator which contains no moving parts, which is instantaneous in its operation, and which is not limited to the commutation of alternating currents.

While this application will herein be described in connection with a particular application, it will be apparent to those skilled in the art that many other practical applications are possible. The following description is, therefore, merely by way of illustration, and is not to be taken as a limitation.

A flight indicator for aircraft has recently been proposed by means of which the luminescent screen of a cathode ray tube is successively illuminated by patterns which supply information to the pilot relating to his rate of turn, heading, position with respect to a radio beacon, altitude and the plane's deviation from a horizontal plane. While all of these indications need not be necessarily supplied on one instrument, it is desirable that certain ones be available to aid the pilot in guiding the plane on a predetermined course.

In accordance with the proposed scheme, a cathode ray tube is energized from a number of sources of information through a motor driven commutator. The commutator is driven at such a speed as to cause all indications to appear to be present simultaneously. It is the purpose of this invention to overcome the obvious disadvantages of the mechanical commutator system and to permit more rapid commutation thereby to reduce the tendency of the images to flicker.

By way of example, a preferred embodiment of my invention will be explained in connection with an instrument which simultaneously indicates rate-of-turn by means of a vertical line trace which moves to the right or left of the center of the cathode ray screen as the heading of the plane is changed, and an artificial horizon for indicating the deviation of the airplane from a horizontal plane by means of a horizontal line trace which assumes an attitude relative to a miniature airplane, the latter being fixed on the instrument face, the artificial horizon and the miniature airplane corresponding to the position and attitude of the real horizon with respect to the airplane in which the instrument is installed. Rate-of-turn indicators and artificial horizons, as such, are well known to the art, and form no part of the present invention.

To illustrate an alternative embodiment of my invention, an indicator will be described which shows the vertical and horizontal deviation of the airplane from a glide path radio beam by means of a circular trace which moves vertically and horizontally on the cathode ray screen, in combination with an artificial horizon. It is evident that by utilizing a system according to either embodiment of my invention, any number of additional traces may be supplied to the indicator, in any desired combination. The method by which the additional traces may be drawn involves merely a duplication of the apparatus shown, as will be apparent to those skilled in the art, so that it need not be described in detail. Thus, to provide an instrument which is particularly useful during sustained flight, the artificial horizon would be combined with a directional indication, a turn indication, and possibly a rate of climb or altitude indication. For a landing instrument, there might be included with the artificial horizon a directional position indication, a radio compass or left-right heading indication, and a glide path indication.

This invention will be better understood from the following description when considered in connection with the accompanying drawings, and its scope is indicated by the appended claims. Similar reference numerals refer to similar parts throughout the several drawings.

Referring to the drawings, Figure 1 is a diagram of a series of control impulses which are utilized in the operation of this invention; Figure 2 is a schematic diagram of a fundamental circuit illustrating the principle of operation of a single indicator applied to the cathode ray tube by mechanical commutation; Figure 3 is an embodiment of my invention in which triode tubes are used; and Figure 4 is an alternative embodiment illustrating the application of this invention to pentode tubes.

Referring to Fig. 1, there is illustrated the necessary time sequence of four control impulses A, B, C and D which are utilized in the application of this invention. A method of producing impulses which occur successively in the manner shown is described in Shumard's U. S. Patent No. 2,146,862, which issued on February 14, 1939, and was assigned to the assignee of the present invention. Any desired number of impulses may be supplied, and it is necessary to have one impulse for each of the indications which are to be applied to the cathode ray tube.

Referring now to Fig. 2, there is illustrated a basic circuit which is involved both in the present invention and the mechanically operated system which has been proposed. A pair of balanced detector tubes 5 and 7 are connected across a pair of tuned circuits comprising, respectively, inductors 9, 11 and capacitors 13, 15. A radio frequency oscillator 17 generates energy of frequency $f1$ which is fed into the resonant circuits.

Capacitors 13 and 15 are differentially variable and are connected to a motor 19. This motor is, for example, a gyro-mechanism which effectively varies the capacitors 13 and 15 as a function of the deviation of the airplane from a predetermined heading. The condenser plates are preferably built into the gyro so that actually no external capacitors are required.

The frequency $f1$ is so chosen that at a midpoint of the range of the capacitors $f1$ lies at a point on one side of the resonance curve of each circuit. The range of the capacitors should not be great enough to permit either circuit to be tuned to resonance. As a result, radio frequency voltages are applied to the grids of the balanced detector tubes 5 and 7 whose amplitudes respectively increase and decrease for a given movement of the motor.

Tubes 5 and 7 are biased so that anode current flows only during positive half cycles of the applied radio frequency voltage. Consequently, the tubes are alternatively made conductive and unipotential or rectified currents flow in their anode circuits. A device subsequently will be described in which varying direct currents are applied to the grids of tubes connected as balanced modulators. The tubes then do not function as detectors, but as amplifiers, and strictly are not "balanced modulators," but for convenience the term is intended to include both balanced modulators and balanced amplifiers. The essential difference between the balanced detectors and the balanced modulators is in the relative biases applied to the input circuits of the devices. The detectors, being usually biased to cut-off, have a slightly different mode of operation.

The anodes of the tubes 5 and 7 are connected respectively by resistors 21 and 23 to a source of anode potential, which is not shown. A direct current, zero-center meter is connected between the anodes. The anodes are also respectively connected through commutators 27 and 29 to the horizontal deflecting plates of a cathode ray indicator 31.

There is produced in the anode circuit of each tube a current whose amplitude varies as a function of the movement of the motor. At the mid capacity the applied radio frequency voltages are equal so that equal direct currents flow through resistors 21 and 23 and no potential difference is produced across the meter 25. On one side of the midpoint of the capacity range the direct current voltage drop across resistor 21 increases while that across resistor 23 decreases, and the meter 25 will be deflected in one direction. On the other side of the midpoint the polarity of the output voltage is reversed and a deflection in the opposite sense is produced.

This varying direct current voltage is used to deflect the cathode ray beam horizontally. It is apparent that the position taken by the beam will be a function of the position of the tuning capacitors, which, in turn, is dependent upon the deviation of the plane from a predetermined heading. If a line trace or "bar" is desired to indicate the rate-of-turn a vertical deflecting voltage from a source 33 is applied to the vertical deflecting plates through a commutator 35.

If the commutators are rotated rapidly it is apparent that while the trace will appear to be on the screen constantly, due to persistence of vision and persistence of the fluorescent screen, it will, in fact, actually be present only a small portion of the time. Other voltages may, therefore, be applied to the cathode ray by connecting the output of similar devices to other contact points on the commutators; for example, a right-left radio compass receiver may be used to feed tubes corresponding to 5 and 7 to produce a direct current output whose polarity and amplitude are a function of the orientation of the loop of the radio compass and the wave front of the received signal.

Having explained the general requirements of a multiple indicating system, it will be seen that the system involves the successive application to the deflecting electrodes of a cathode ray both alternating and direct current potentials. Consequently, it is the principal object of this invention to provide electronic commutators which are capable of switching both direct and alternating potentials. One such system is illustrated in Fig. 3, to which reference is now made.

The system illustrated includes two units which will draw a turn bar and an artificial horizon. Since other similar units may be connected in parallel, as will be explained later, to provide any other desired indications, it is necessary to describe in detail but one of them. The upper unit provides the horizontal deflecting voltages and the lower unit provides the vertical deflecting voltages. The latter unit is similar to the former, and its elements bear reference numerals which are identified by a subscript one.

The tubes 6 and 8 are biased beyond cut off in the absence of the control impulse. The circuit is similar to that shown in Fig. 2, but provision is made for the insertion of the positive control impulse A and an alternating frequency voltage of any desired frequency $f2$ in the common grid return. The amplitude of the control impulse is sufficient to overcome the fixed bias and permit the system to operate as a balanced modulator in which the degree of balance is determined by the position of the differential capacitors 13, 15.

A pair of diode rectifiers 37, 39 are coupled to the output of tubes 6, 8 by a center-tapped transformer 41. The rectifier cathodes are connected together by a center-tapped resistor 43. Between the center tap of the secondary of transformer 41 and the center tap of resistor 43 a voltage of frequency $f2$ is impressed by a transformer 45. The cathode of rectifier tube 39 is connected to ground by a resistor 47. One vertical and one horizontal cathode ray deflecting plate are grounded, while the remaining horizontal deflecting plate is connected to the cathode of rectifier 37 and the remaining vertical deflecting plate is connected to the cathode of rectifier tube $37_1$.

To provide a vertical line drawing voltage for the turn bar, and a horizontal line drawing voltage for the artificial horizon a pair of controlled amplifiers 49, $49_1$, are provided. Their respective grids are connected to the common grid return of their associated balanced modulators so that both the control impulse and a voltage of frequency $f2$ are applied to their inputs. The anode of tube 49 is coupled to the vertical deflecting circuit, while the anode of tube 49₁, is coupled to the horizontal deflecting circuit so that for the duration of the control impulse A, which operates the horizontal deflecting circuit, a vertical drawing voltage is applied to the tube, and likewise for the duration of the control impulse B, which operates the vertical deflecting circuit, a horizontal drawing voltage is applied to the tube.

The arrows X, X going out from the anodes of tubes 6 and 8 indicate the point at which other horizontal deflecting modulators are to be connected. The arrows Y, Y going out from the anodes of tubes 6₁, 8₁ likewise indicate the point at which other vertical deflecting modulators are to be connected. Control impulses C, D, etc., will be used to operate successively the additional deflecting units which are energized by and respond to any desired mechanical or electrical change. The two pairs of rectifiers 37, 39 and 37₁, 39₁ are respectively common to all horizontal and vertical deflecting sources.

The need for the inclusion of the voltage $f2$ and the rectifier system shown arises from the fact that it is inadvisable to connect two or more systems of the type shown in Fig. 2 in parallel, since the fixed anode potentials of the system or systems which are biased off will be in parallel with and prevent changes in the anode potentials of the system which at any instant is operating. However, in this embodiment of my invention the average direct current potentials of the anodes of tubes 6 and 8, for example, remain essentially constant. However, the variable currents from any of the parallel-connected systems are applied through the transformer 41 and hence through the rectifiers 37, 39 to the cathode ray tube deflecting electrodes. Thus, the rectifiers, in addition to rectifying, act as isolating devices.

The amplitudes of the currents of frequency $f2$ which flow in opposite directions through the split primary of transformer 41 are dependent upon the degree of unbalance which is present in the input circuits of the tubes. When the induced secondary voltages of frequency $f2$ combine with the voltage of like frequency which appears across the secondary of transformer 45, a resultant is produced which depends on the amplitude and phase of the component voltages, which, in turn, depend on the relative amplitudes of the currents in the primary of transformer 41. Consequently, the rectified direct currents which flow through the respective halves of resistor 43 are, as before, proportional to the degree of unbalance, so that a direct voltage is produced whose polarity corresponds to the sense and whose amplitude is proportional to the degree of the original unbalance.

It may be seen that with the system just described electronic commutation of alternating and direct voltages is accomplished, and means is provided for connecting a plurality of similar systems in parallel without reducing their efficiency.

Referring now to Fig. 4, I have shown an alternative embodiment of my invention in which pentode tubes are used. The control bias impulse is applied to the screen grid, for example. This system has been illustrated in a preferred arrangement by which, for one indication, drawing voltages are applied to the vertical and the horizontal deflecting plates in phase quadrature so that a circular trace is produced. The circular trace is adapted to be moved horizontally and vertically to indicate the vertical and horizontal deviation from a landing or glide path beam. For the other indication an artificial horizon is again included. By adding control systems responsive to other changes, such as those of the type described in connection with Fig. 3, a turn bar or any other indication may be included, as will be understood by those skilled in the art.

The first unit of the arrangement illustrated in Fig. 4 comprises two balanced horizontal line drawing modulators 51 and 53 and two balanced vertical deflecting modulators 55 and 57 the outputs of which are respectively connected to the appropriate deflecting plates of the cathode ray tube 59. Oscillations of a frequency $f2$ are obtained from a source 61 and applied in phase opposition to the input grids of the modulators 51 and 53 by a transformer 63. The control impulse "C" is applied between the screen grid and ground of each tube so that anode current flows only for the duration of the impulse.

The inputs of the vertical modulators 55, 57 are fed by appropriate voltages whose respective instantaneous polarities and amplitudes are a function of the longitudinal tilt of the airplane. When the voltages are obtained from a source 65 which is, for example, that portion of Fig. 2 to the left of the terminals E, F, G, 55 and 57 behave as modulators. The screen grids of tubes 55 and 57 are likewise energized by control impulse "C."

Control impulse D similarly controls horizontal modulators 67, 69 and vertical modulators 71, 73. It is to be observed that the anodes of the last mentioned amplifiers are connected directly to the corresponding anodes of the modulators of the unit controlled by impulse C. Likewise, the anodes of all additional modulators would be connected in parallel.

The inputs to the horizontal and vertical modulators 67, 69 and 71, 73 are controlled by direct current voltages from sources 75 and 77, respectively, which are directional receivers responsive to the horizontal and vertical deviation of the airplane from the landing beam or glide path. One such receiver is shown, for example, on page 536 of the third edition of a book by R. Keen, entitled "Wireless Direction Finding," and published in London in 1938 by Iliffe and Sons, Ltd. In addition, voltages of any desired frequency, preferably audio, are superimposed on the grids for the purpose of drawing the circular trace. Thus, the source 62 supplies a voltage of frequency $f3$ to a transformer 79 having a center-tapped secondary, the two halves of which are connected respectively to an inductor 81 and a capacitor 83. Voltages in phase quadrature with respect to ground are therefore applied to the grids of a pair of triodes 85, 87. The output of tube 85 is coupled into the inputs of the vertical modulators 71, 73 while that of the tube 87 is coupled into the inputs of the horizontal modulators 67, 69 so that when the control impulse D renders operative both the modulators, the drawing voltage and the direct current deflecting potentials are simultaneously applied to the cathode ray deflecting electrodes.

In a similar manner, a trace of any desired pattern may be superimposed on the deflecting voltages so that the various indications may be distinguished.

I have found that the application of the control impulses may cause a certain amount of distortion of the trace due to transient voltages which are produced. To correct this, I propose to apply a negative potential to the intensity control grid of the cathode ray tube during the instant the control impulse is arriving, but which dies away quickly so that the cathode ray tube is in operation throughout most of the control impulse duration. This is accomplished by impressing the voltage which operates the impulse generator across a serially connected rectifier and resistor-capacitor combination, and applying the developed direct voltage to the cathode ray grid.

I have thus described a commutation system with which direct and alternating current potentials may be successively applied to an indicating or utilization device by electronic means, and I have shown several modifications of my invention.

I claim as my invention:

1. In a device of the character described, a plurality of normally inoperative balanced modulators, means for causing said modulators to be made successively operative during discrete periods by a series of successively occurring control impulses, a source of alternating voltage, means for impressing said voltage in phase on the input circuits of each of said balanced modulators, means respectively associated with the input circuits of said modulators for causing degrees of unbalance in said modulators corresponding to changes in conditions to be observed which produce alternating output currents whose amplitudes and phases vary in accordance with said conditions to be indicated, common means for deriving direct voltages from the output currents of said modulators during said successive discrete periods, the amplitudes and polarities of said direct voltages being proportional to said degrees of unbalance, a cathode ray indicator having ray deflecting means, means for applying said direct voltages to said deflecting means, and means for applying different line drawing voltages to other deflecting means to produce successive reference lines during said discrete periods so that each condition is separately and successively indicated on said cathode ray by the position of said reference lines.

2. In a device of the character described, a plurality of balanced modulators, a common source of direct current power for said modulators, a cathode ray indicator having oppositely positioned pairs of deflecting plates, said modulators being normally inoperative and adapted to be made operative in response to a series of successively applied impulses, means respectively associated with each of said modulators for unbalancing said modulators in accordance with conditions to be indicated, means for applying alternating voltages to the inputs of said modulators to produce alternating output currents whose amplitudes and phases vary in accordance with the degree and direction of unbalance of said modulators, rectifiers respectively coupled to said modulators for deriving direct voltages from said modulators whose amplitudes and polarities are respectively a function of the output currents of the associated balanced modulators, and means for applying said direct voltages to said deflecting plates to deflect said beam successively to indicate said conditions.

3. An electronic commutator comprising a balanced modulator which is normally inoperative, means for applying a commutating impulse to said modulator to cause it to thereby become operative for the duration of said impulse, a source of alternating current, means for applying said current in-phase to said modulator, means for unbalancing said modulator in accordance with a voltage to be commutated to produce alternating output currents whose relative amplitudes and phases correspond to the degree and direction of unbalance, rectifying means coupled to the output of said modulator, means for applying said alternating current in-phase to said rectifiers to produce a resultant alternating current, and means for deriving from said rectifiers a direct voltage whose amplitude and polarity changes with a change in the amplitude of said resultant current corresponding to a change in the balance of said modulators.

4. In a device of the character described, the combination which includes a cathode ray indicator, means for successively drawing a plurality of distinct traces on said indicator, means for successively displacing said traces an amount corresponding to changes in conditions which are to be observed, said last named means comprising a normally inoperative balanced modulator for each condition to be observed, said modulator being unbalanced by one of said conditions, common rectifying means coupled between the outputs of said modulators and said indicator, and means for causing said modulators to become operative successively so that the positions of said traces are determined by the degree of unbalance of corresponding modulators.

5. In a device of the character described, the combination which includes a cathode ray indicator, means for drawing a plurality of distinctive line traces on said indicator at distinct intervals, means for displacing said traces in given directions to indicate changes in respective conditions, each of said last named means comprising a normally inoperative balanced modulator adapted to be unbalanced by a change in one of said conditions, common rectifying means coupled between the output of said modulators and said indicator, means for successively causing said modulators to become operative and for simultaneously applying one of said traces to said cathode ray so that traces corresponding respectively to said conditions appear successively on said cathode ray.

6. In a cathode ray indicator, the combination which includes a cathode ray tube having vertical and horizontal deflecting means, a first balanced modulator, means for applying an alternating voltage in phase to said balanced modulator, means for unbalancing said modulator in accordance with a first condition to be observed to produce alternating output currents whose amplitude and phase correspond to the degree and direction of said unbalance, a balanced rectifier coupled to said balanced modulator for rectifying said output currents to produce a direct potential whose amplitude and polarity vary as a function of said condition, means for applying a commutating impulse to said modulator to cause it to become operative during successive time periods, means for applying said direct potential to said vertical deflecting means, a second balanced modulator, means for applying said alternating voltage in phase to said second balanced modulator, means for unbalancing said second modulator in accordance with a second condition to be observed to produce alternating output currents whose amplitude and phase correspond to the degree and direction of said unbalance, a balanced rectifier coupled to said second modulator for rectifying said output currents to produce a second direct potential whose amplitude and polarity vary as a function of said condition, means for applying a commutating impulse to said second modulator to cause it to become operative during alternate time periods, means for applying said second direct potential to said horizontal deflecting means, and means controlled by said commutating impulses, respectively, for applying line drawing voltages to said horizontal and vertical deflecting means to produce, alternately, a horizontal trace whose vertical position is indicative of said first condition and a vertical trace whose horizontal position is indicative of said second condition.

DONALD S. BOND.